(12) United States Patent
Sodhi et al.

(10) Patent No.: US 11,645,017 B2
(45) Date of Patent: May 9, 2023

(54) PRINT GOVERNANCE MANAGEMENT

(71) Applicant: International Business Machines Corporation, Armonk, NY (US)

(72) Inventors: Manjit Singh Sodhi, Bangalore (IN); Sarbajit K. Rakshit, Kolkata (IN); Raghuveer Prasad Nagar, Kota (IN); Poornima Iyengar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/350,024

(22) Filed: Jun. 17, 2021

(65) Prior Publication Data

US 2022/0405027 A1   Dec. 22, 2022

(51) Int. Cl.
*G06F 3/12*  (2006.01)
(52) U.S. Cl.
CPC .......... *G06F 3/1219* (2013.01); *G06F 3/1239* (2013.01); *G06F 3/1254* (2013.01); *G06F 3/1286* (2013.01)

(58) Field of Classification Search
None
See application file for complete search history.

(56) References Cited

U.S. PATENT DOCUMENTS

| | | |
|---|---|---|
| 2005/0231758 A1 | 10/2005 | Reynolds |
| 2012/0033237 A1 | 2/2012 | Arora |
| 2013/0128315 A1 | 5/2013 | Arora |
| 2013/0135673 A1 | 5/2013 | Murakawa |

(Continued)

FOREIGN PATENT DOCUMENTS

| | | | |
|---|---|---|---|
| CN | 102029820 B | | 1/2014 |
| CN | 102385494 B | * | 4/2016 |

(Continued)

OTHER PUBLICATIONS

Authors et al.: Disclosed Anonymously, "Intelligent Printing—Automated avoidance of minimal value pages", An IP.com Prior Art Database Technical Disclosure, IP.com No. IPCOM000195714D, IP.com Electronic Publication Date: May 12, 2010, 2 Pages.

(Continued)

*Primary Examiner* — Fan Zhang
(74) *Attorney, Agent, or Firm* — Michael O'Keefe (57) ABSTRACT

In an approach to governance of document printing, one or more computer processors receive a request from a user to print a document. One or more computer processors identify a content and a context of the document. Based on the content and the context of the document, one or more computer processors determine whether the request complies with one or more printing policies. Responsive to determining the request complies with the one or more printing policies, one or more computer processors determine one or more format attributes of the document. Based on the one or more format attributes, one or more computer processors determine whether the document format is optimized, where optimization minimizes use of one or more printing supplies. Responsive to determining the document format is not optimized, one or more computer processors provide a recommendation for optimizing the document format to the user.

20 Claims, 3 Drawing Sheets

(56) References Cited

U.S. PATENT DOCUMENTS

2015/0029536 A1\* 1/2015 Suzuki .................. G06F 3/1239
                                                    358/1.14
2019/0196753 A1\* 6/2019 Minegishi ............. G06F 3/1258
2021/0297546 A1\* 9/2021 Romero ............. G06F 21/6245

FOREIGN PATENT DOCUMENTS

| JP | 2006338237 A |   | 12/2006 |
| JP | 2008296381 A | \* | 12/2008 |
| JP | 2012252082 A | \* | 12/2012 |

OTHER PUBLICATIONS

Authors et al.: Disclosed Anonymously, "Smarter Apparatus and Methods For Greener Printing", An IP.com Prior Art Database Technical Disclosure, IP.com No. IPCOM000191544D, IP.com Electronic Publication Date: Jan. 6, 2010, 3 Pages.

\* cited by examiner

PRINT GOVERNANCE MANAGEMENT

BACKGROUND OF THE INVENTION

The present invention relates generally to the field of natural language processing, and more particularly to governance of document printing.

Natural language processing (NLP) is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input.

Green engineering involves four basic approaches to improve processes and products to make them more efficient from an environmental standpoint: waste reduction, materials management, pollution prevention, and product enhancement. Many engineering disciplines engage in green engineering, including sustainable design, life cycle analysis (LCA), design for the environment (DfE), design for disassembly (DM), and design for recycling (DfR). In addition to engineering disciplines, green engineering includes land use planning, architecture, landscape architecture, and other design fields, as well as the social sciences.

SUMMARY

Embodiments of the present invention disclose a computer-implemented method, a computer program product, and a system for governance of document printing. The computer-implemented method may include one or more computer processors receiving a request from a user to print a document. One or more computer processors identify a content and a context of the document. Based on the content and the context of the document, one or more computer processors determine whether the request complies with one or more printing policies. Responsive to determining the request complies with the one or more printing policies, one or more computer processors determine one or more format attributes of the document. Based on the one or more format attributes, one or more computer processors determine whether the document format is optimized, where optimization minimizes use of one or more printing supplies. Responsive to determining the document format is not optimized, one or more computer processors provide a recommendation for optimizing the document format to the user.

DETAILED DESCRIPTION

Recent attempts have been made to make technology more environmentally friendly. The resulting technologies are typically called green technologies. For example, green technologies have been developed for computers, automobiles, household appliances, etc. With respect to computing technologies, a significant environmental concern stems from the printing of paper. Computer users may use computer printers to print large quantities of various types of documents, which typically leads to the use of large amounts of paper. A large demand for paper may lead to the destruction of large quantities of trees, which may have a negative impact on the environment.

Many enterprises employ network printers. Current print management systems enable the enterprise users to send documents for printing to a printer queue from any office location and, after logging in, collect the printed documents from a printer at another location. At times, a user may print a document with content that is not allowed, not needed for official purposes, not relevant to the user's job role, or personal content. Printing these types of documents may not only violate an established policy, but also consumes paper and ink, incurring cost to the enterprise as well as negating a green environment concept.

Embodiments of the present invention recognize that cost savings may be made by providing a print management system that can detect, analyze, and cancel printing of inappropriate content, thereby saving paper and/or ink. Embodiments of the present invention also recognize that efficiency may be gained by optimizing the layout of a printed document deemed appropriate for printing, such that the use of paper and/or ink are minimized. Implementation of embodiments of the invention may take a variety of forms, and exemplary implementation details are discussed subsequently with reference to the Figures.

Figure 1:
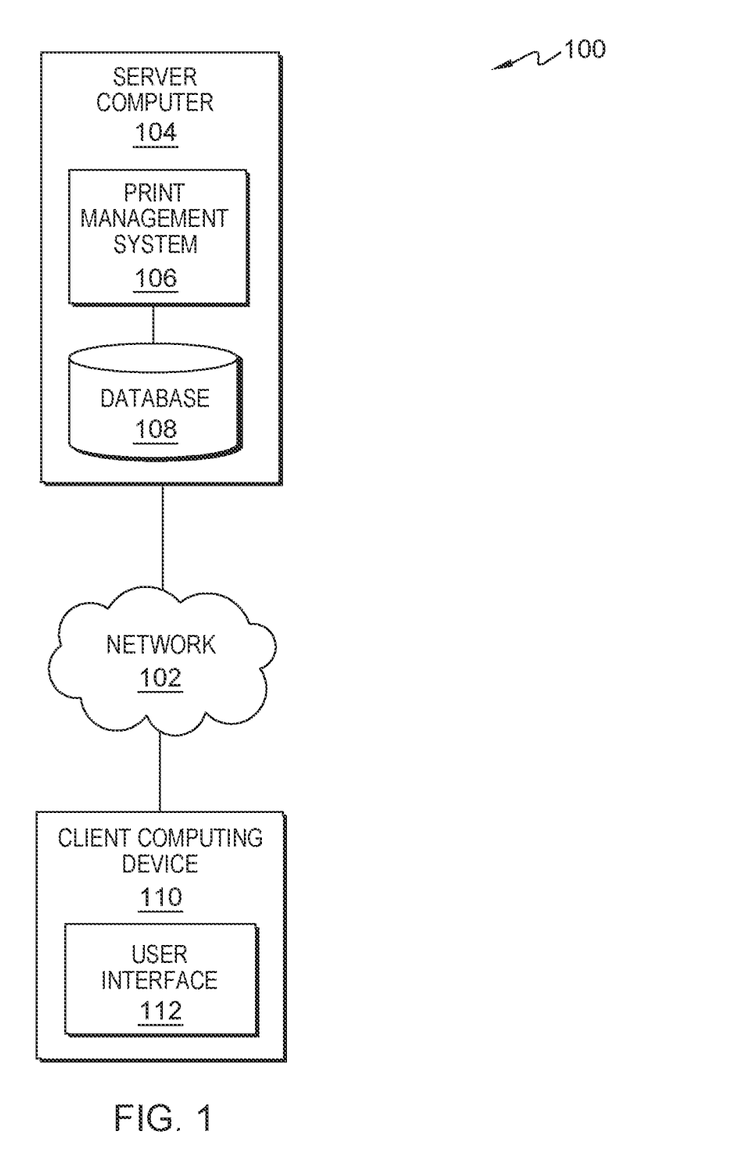
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes print management system 106 and database 108. Server computer 104 may include internal and external hardware components, as depicted and described in further detail with respect to FIG. 3.

Print management system 106, in an effort to reduce enterprise expenses and protect the environment, analyzes content of a print request and determines whether the content is allowed and/or appropriate to be printed. If allowed, print management system 106 optimizes the layout of the printed document to minimize use of printing supplies, such as paper and/or ink. If not allowed, print management system 106 cancels the printout and alerts the user and cancels the print request. In the depicted embodiment, print management system 106 resides on server computer 104. In another embodiment, print management system 106 resides on a network printer (not shown).

Print management system 106 receives a print request from a user. Print management system 106 determines whether the document was printed previously, and, if so, alerts the user and cancels the print request. Print management system 106 identifies the content and context of the document associated with the print request. Print management system 106 determines whether the print request complies with printing policy. If print management system 106 determines the print request does not comply with printing policy, then print management system 106 alerts the user and cancels the print request. If print management system 106 determines the print request does comply with printing policy, then print management system 106 determines whether the document format is optimized. If print management system 106 determines the format is not optimized, then print management system 106 provides a recommendation for an optimized format to the user. If the recommendation is accepted by the user, then print management system 106 sends the optimized document to the printer. If the recommendation is not accepted by the user, then print management system 106 sends the original document to the printer. Print management system 106 logs the print request and outcome. Print management system 106 is depicted and described in further detail with respect to FIG. 2.

Database 108 stores information used and generated by print management system 106. In the depicted embodiment, database 108 resides on server computer 104. In another embodiment, database 108 may reside elsewhere within distributed data processing environment 100, provided that print management system 106 has access to database 108. A database is an organized collection of data. Database 108 can be implemented with any type of storage device capable of storing data and configuration files that can be accessed and utilized by print management system 106, such as a database server, a hard disk drive, or a flash memory. Database 108 represents one or more databases that store a user profile for the user of client computing device 110. The user profile may include, but is not limited to, the name of the user, an address, an email address, a voice sample, a phone number, a credit card number, an account number, an employer, a job role, a job family, a business unit association, a job seniority, a job level, a resume, a medical record, a social network affiliation, etc. The user profile may also include user preferences for printing, such as font size, font style, page layout, etc. In addition, database 108 may store a directory of an enterprise that lists, for example, employees, members, job titles, and office locations. Database 108 stores any governance policies for document printing. Governance policies may include, but are not limited to, applicable government laws and regulations, enterprise rules and policies, etc. Database 108 also stores a log of print requests and associated outcomes.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Print management system 106 enables the authorized and secure processing of personal data. Print management system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Print management system 106 provides information regarding personal data and the nature (e.g., type, scope, purpose, duration, etc.) of the processing. Print management system 106 provides the user with copies of stored personal data. Print management system 106 allows the correction or completion of incorrect or incomplete personal data. Print management system 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 110 may be integrated into a vehicle of the user. For example, client computing device 110 may include a heads-up display in the windshield of the vehicle. In general, client computing device 110 represents one or more programmable electronic devices or combination of programmable electronic devices capable of executing machine readable program instructions and communicating with other computing devices within distributed data processing environment 100 via a network, such as network 102. Client computing device 110 includes an instance of user interface 112.

User interface 112 provides an interface between print management system 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of client computing device 110 to request a print via print management system 106 and to receive alerts and messages from print management system 106. User interface 112 also enables a user of client computing device 110 to input a user profile and/or print preferences to be stored in database 108.

Figure 2:
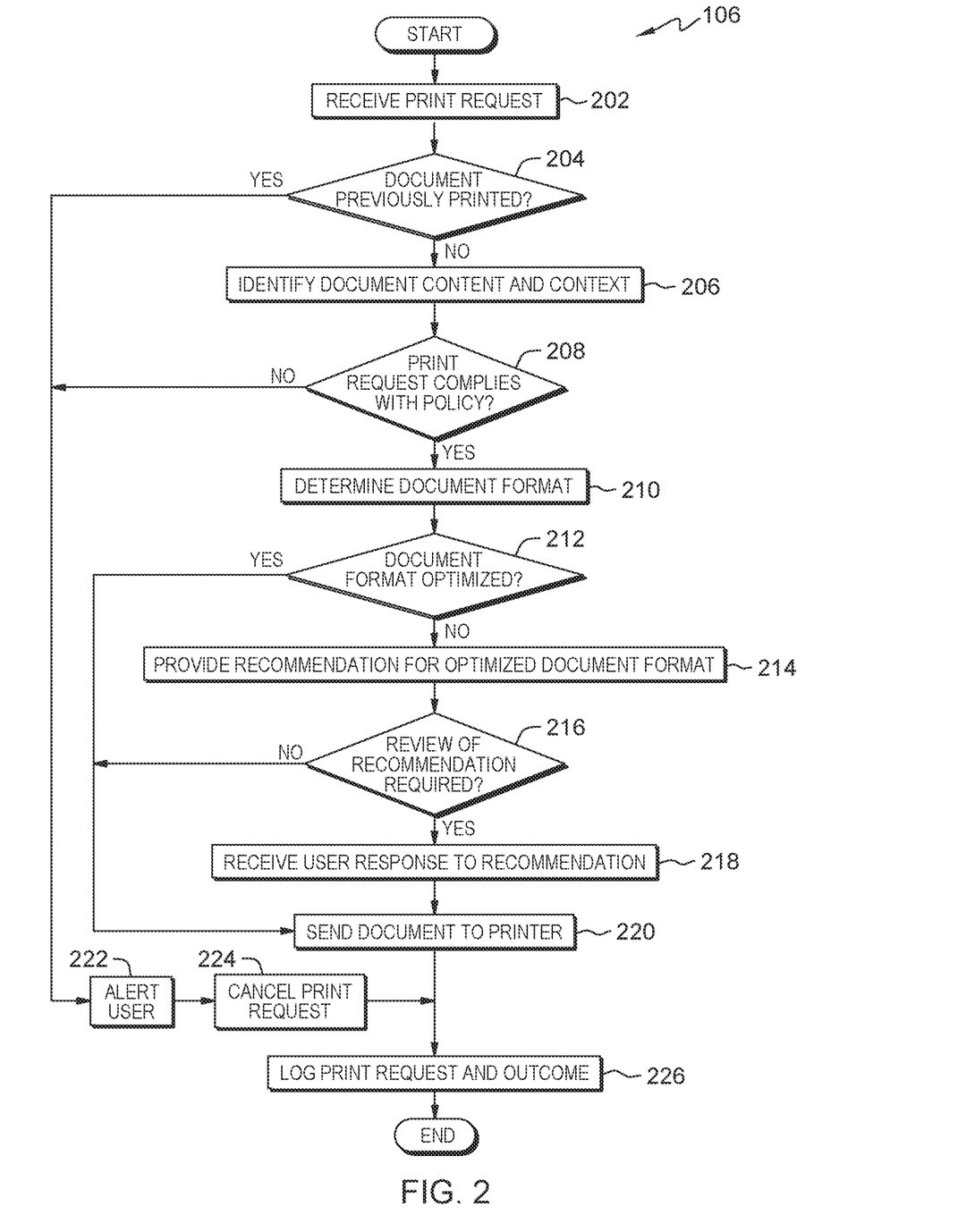
FIG. 2 is a flowchart depicting operational steps of a print management system, on a server computer within the distributed data processing environment of FIG. 1, for governance of document printing, in accordance with an embodiment of the present invention.

FIG. 2 is a flowchart depicting operational steps of print management system 106, on server computer 104 within distributed data processing environment 100 of FIG. 1, for governance of document printing, in accordance with an embodiment of the present invention.

Print management system 106 receives a print request (step 202). In an embodiment, a user of client computing device 110 submits a request to print a document on a network printer (not shown) via user interface 112, and print management system 106 receives the request.

Print management system 106 determines whether the document was printed previously (decision block 204). In an embodiment, print management system 106 determines if the document associated with the print request was previously printed by another user. In an embodiment, print management system 106 determines whether the document was printed by another user that is within a threshold distance of the current requestor. For example, print management system 106 may determine whether the other user is within a distance to the current requestor, such as in the same office building, such that borrowing a previously printed document is reasonable. In an embodiment, print management system 106 determines whether the document was printed by another user within a threshold time limit. For example, print management system 106 may determine whether the other user printed the document within a recent time frame such that it is unlikely that the other user discarded the document yet. In an embodiment, print management system 106 determines that the document associated with the print request was printed previously by the current requestor.

If print management system 106 determines the document was not printed previously ("no" branch, decision block 204), then print management system 106 identifies the content and context of the document associated with the print request (step 206). In an embodiment, print management system 106 uses one or more natural language processing (NLP) techniques to analyze the content and context of the document associated with the received print request. For example, print management system 106 may use one or more of syntax, semantics, and pragmatics techniques. By identifying the content and context of a document, print management system 106 determines a type of the document included in the print request. Print management system 106 determines whether the document is an official document, a work-related document, a personal document, etc. For example, print management system 106 determines the document is a work-related requirements specification needed for a discussion with a client.

Print management system 106 determines whether the print request complies with printing policy (decision block 208). In an embodiment, one or more printing policies are stored in database 108, and print management system 106 compares the identified content and context of the document associated with the print request to the one or more policies. Policies may be associated with one or more enterprise regulations. For example, the enterprise may have regulations associated with security of a document, such that a confidential document is not allowed to be printed. In another example, the enterprise may have policies associated with a job role of the requestor, such that document that does not pertain to the job role of the requestor is not allowed to be printed. In yet another example, the enterprise may have policies associated with the content of the document, such that documents with personal information, or of personal interest, e.g., a bank statement, a novel, an article of general knowledge, etc., are not allowed to be printed. In a further example, the enterprise may have polices associated with printing personal information that is needed for an official purpose, such as a travel VISA form or immigration form.

Policies may also be associated with a government regulation. For example, if a document is copyrighted, then it may be prohibited by law to print the document. In addition, policies may be associated with a time relevance. For example, the enterprise may prohibit printing documents associated with a product prior to the public announcement of the product. In another example, the enterprise may prohibit the printing of an academic exam prior to the start of the exam. Further, policies may be associated with the availability of a previously printed copy of the document. For example, if the document was printed by another user with the same job role as the requestor, then printing a second time is not allowed. In another example, if the document was printed by a user whose office is within a threshold distance of the office of the requestor, then printing a second time is not allowed.

In an embodiment, print management system 106 retrieves information from database 108 to determine whether the print request complies with one or more printing polices. For example, print management system 106 retrieves the one or more applicable printing policies. In another example, print management system 106 retrieves the profile of the user of client computing device 110 to determine the job role of the user. In an embodiment, print management system 106 retrieves data from one or more applications associated with the user of client computing device 110. For example, print management system 106 may determine by retrieving the user's email or calendar from client computing device 110 that the user is planning a trip overseas and, therefore, needs to print personal information associated with a travel VISA application.

If print management system 106 determines the document was printed previously ("yes" branch, decision block 204), or if print management system 106 determines the print request does not comply with printing policy ("no" branch, decision block 208), then print management system 106 alerts the user (step 222). In an embodiment, print management system 106 notifies the user of client computing device 110, via user interface 112, that a printed copy is available from another user or was printed previously by the current requestor. In the embodiment, print management system 106 identifies the user that printed the document previously in the notification. In an embodiment, print management system 106 alerts the user of client computing device 110, via user interface 112, that the requested printout does not comply with one or more printing policies. In an embodiment, print management system 106 causes user interface 112 to display a message on a screen associated with client computing device 110. In another embodiment, print management system 106 sends a notification to the user via email or text message. In an embodiment, print management system 106 includes in the notification a list of the one or more policies with which the print request does not comply. In one embodiment, print management system 106 may include an option to request an exception in the notification. For example, print management system 106 may include a button that, when selected, starts an email to the user's manager.

Print management system 106 cancels the print request (step 224). In an embodiment, if print management system 106 determines the print request does not comply with the printing policy or was printed previously, then print management system 106 cancels the print request such that the document is not printed. In an embodiment, print management system 106 includes in the notification that the print request is cancelled.

If print management system 106 determines the print request does comply with printing policy ("yes" branch, decision block 208), then print management system 106 determines the document format (step 210). In an embodiment, print management system 106 determines one or more format attributes of the document. For example, print management system 106 determines a font type, a font size, a line spacing, a number of pages, a page margin size, whether the document is set up for double-sided printing, color or black and white ink, whether images are present and, if so, details of the images, such as size, color, resolution, etc.

Print management system 106 determines whether the document format is optimized (decision block 212). In an embodiment, print management system 106 determines whether the current format attributes of the document are optimized with regards to minimizing the use of printing supplies, such as paper and/or ink. For example, the use of double-sided printing reduces the number of pages by a factor of two. In another example, the use of narrow margins enables more words to be printed per page and may reduce the number of pages to print. An optimized document format results in a cost savings for the enterprise by reducing the expense of paper and/or ink. In addition, optimizing the format of the document contributes to a greener environment by reducing waste of materials.

If print management system 106 determines the document format is not optimized ("no" branch, decision block 212), then print management system 106 provides a recommendation for an optimized document format (step 214). In an embodiment, print management system 106 sends a recommendation to the user, via user interface 112, to indicate one or more changes to the document format that will optimize the format with respect to minimizing the use of paper and/or ink. For example, print management system 106 may suggest that the user change to double-sided printing.

In an embodiment, print management system 106 automatically changes the format attributes of the document to optimize the format without sending a recommendation or receiving approval from the user, thereby minimizing the use of paper and/or ink. For example, print management system 106 may reduce a font size such that more words are printed per page, resulting in less pages to print. In another example, print management system 106 may reduce the resolution of any images present to reduce the amount of ink used in the printout.

Print management system 106 determines whether a review of the recommended document format is required (decision block 216). In an embodiment, an enterprise establishes one or more printing policies that determine whether a user has to review recommended changes to document format attributes prior to printing. The one or more policies may define limitations and/or thresholds for printing. For example, there may be a page limit on printouts, such as printing of documents longer than twenty pages is not allowed. In an embodiment, the one or more printing policies are stored in database 108. In an embodiment, print management system 106 retrieves the one or more printing policies and determines whether a review of the recommendation by the user is required.

If print management system 106 determines a review of the recommended document format is required ("yes" branch, decision block 216), then print management system 106 receives a user response to the recommendation (step 218). In an embodiment, print management system 106 receives a response to the recommendation for optimizing the format of the document via user interface 112. In an embodiment, print management system 106 provides "yes" and "no" buttons within the recommendation notification such that the user can choose whether to accept the recommendation, and print management system 106 receives a response when the user chooses a button. In an embodiment, print management system 106 provides an interactive list of format attributes that can be optimized within the recommendation notification, such that the user can choose to enable one or more of the recommended changes, and print management system 106 receives a response when the user chooses one or more attributes from the list. In an embodiment, upon receiving a response to the recommendation that approves one or more of the recommended changes, print management system 106 applies the approved changes to the document format.

Responsive to receiving a user response to the recommendation, or if print management system 106 determines a review of the recommended document format is not required ("no" branch, decision block 216), or if print management system 106 determines the document format is optimized ("yes" branch, decision block 212), then print management system 106 sends the document to the printer (step 220). In an embodiment, once the format of the document is optimized, either as it was initially or after print management system 106 optimized the format, or once print management system 106 incorporates the response from the user, print management system 106 sends the document to a network printer. In another embodiment, print management system 106 sends the optimized document to the user of client computing device 110, via user interface 112, such that the user can review the optimized formatting prior to printing. In the embodiment, print management system 106 can include a message that describes the changes to the formatting.

Responsive to sending the document to the printer or cancelling the print request, print management system 106 logs the print request and outcome (step 226). In an embodiment, print management system 106 stores the details of the print request and the outcome of the request in database 108. For example, print management system 106 stores a date and timestamp of the request. In another example, print management system 106 stores the identification of the requestor, i.e., the user of client computing device 110. In yet another example, print management system 106 stores any formatting changes made to optimize the format of the document. In a further example, print management system 106 stores a list of one or more policies associated with print request and outcome of the request, i.e., reasons why print management system 106 cancelled the print request. By keeping a log of the print requests and associated outcomes, print management system 106 can track whether a printed copy of the document already exists, as well as the identification and location of the user that printed the document. Further, the log can be used for auditing and/or compliance reporting when required by an entity, such as a government. In an embodiment, print management system 106 stores the response to the recommendation from the user. Storing the responses may enable print management system 106, via machine learning, to improve the initial deployment based on the feedback inferred from the user action on the recommendation, such as by determining the frequency with which recommendations for changes to various format attributes are accepted. In an embodiment, print management system 106 dynamically generates printing rules based a user's role, preferences, and profile, as well as on the extracted context of the document. Print management system 106 stores the generated printing rules in database 108, such that print management system 106 can refer to them in the future instead of creating rules for the same factors and/or the same user again.

Figure 3:
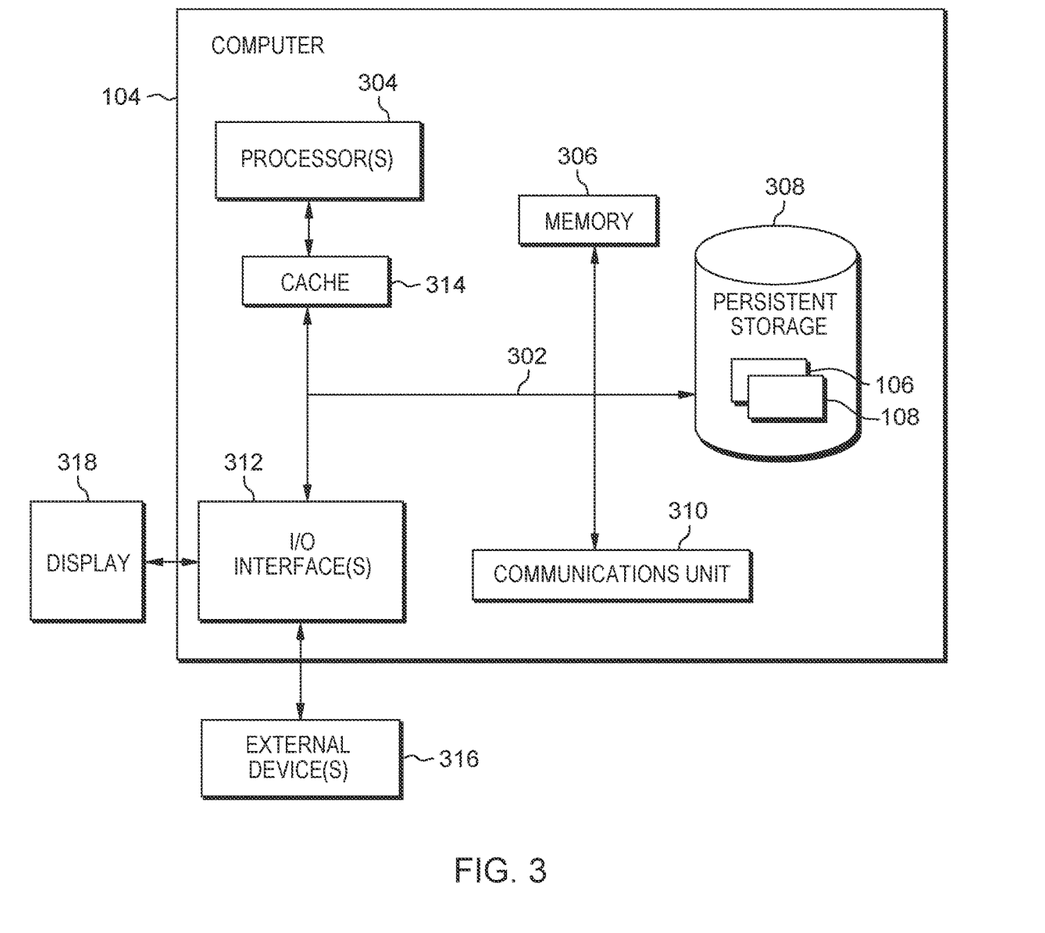
FIG. 3 depicts a block diagram of components of the server computer executing the print management system within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., print management system 106 and database 108, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 110. In these examples, communications unit 310 includes one or more network interface cards. Communications unit 310 may provide communications through the use of either or both physical and wireless communications links. Print management system 106, database 108, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., print management system 106 and database 108 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, a request from a first user to print a document;
    determining, by one or more computer processors, the document was printed previously by a second user;
    determining, by one or more computer processors, that the second user is not within a threshold distance of the first user;
    identifying, by one or more computer processors, a content and a context of the document;
    based on the content and the context of the document, determining, by one or more computer processors, whether the request complies with one or more printing policies, wherein at least one of the one or more printing policies pertains to a job role of the user;

responsive to determining that the second user is not within a threshold distance of the first user and that the request complies with the one or more printing policies, determining, by one or more computer processors, one or more format attributes of the document;

based on the one or more format attributes, determining, by one or more computer processors, whether a document format is optimized, wherein optimization minimizes use of one or more printing supplies; and responsive to determining the document format is not optimized, providing, by one or more computer processors, a recommendation for optimizing the document format to the user.

2. The computer-implemented method of claim 1, further comprising:

determining, by one or more computer processors, a review of the recommendation by the user is required;

receiving, by one or more computer processors, a response to the recommendation from the user; and sending, by one or more computer processors, the document to a printer.

3. The computer-implemented method of claim 1, further comprising:

determining, by one or more computer processors, the document was printed previously by a third user;

determining, by one or more computer processors, that the third user is within a threshold distance of the first user;

alerting, by one or more computer processors, the user the document was printed previously; and cancelling, by one or more computer processors, the request.

4. The computer-implemented method of claim 1, further comprising:

logging, by one or more computer processors, the request; and logging, by one or more computer processors, an outcome of the request.

5. The computer-implemented method of claim 1, further comprising:

responsive to determining the request does not comply with the one or more printing policies, alerting, by one or more computer processors, the user that the request does not comply with the one or more printing policies; and cancelling, by one or more computer processors, the request.

6. The computer-implemented method of claim 1, wherein the one or more format attributes of the document include at least one of: a font type, a font size, a line spacing, a number of pages, a page margin size, whether the document is set up for double-sided printing, whether an ink is color or black and white, whether images are present, a size of an image, a color of an image, and a resolution of an image.

7. The computer-implemented method of claim 1, further comprising:

responsive to determining the document format is not optimized, changing, by one or more computer processors, automatically one or more of the one or more format attributes of the document to optimize the format.

8. A computer program product comprising:

one or more computer readable storage media and program instructions collectively stored on the one or more computer readable storage media, the stored program instructions comprising:

program instructions to receive a request from a user to print a document;

program instructions to determine the document was printed previously by a second user;

program instructions to determine that the second user is not within a threshold distance of the first user;

program instructions to identify a content and a context of the document;

based on the content and the context of the document, program instructions to determine whether the request complies with one or more printing policies, wherein at least one of the one or more printing policies pertains to a job role of the user;

responsive to determining that the second user is not within a threshold distance of the first user and that the request complies with the one or more printing policies, program instructions to determine one or more format attributes of the document;

based on the one or more format attributes, program instructions to determine whether a document format is optimized, wherein optimization minimizes use of one or more printing supplies; and responsive to determining the document format is not optimized, program instructions to provide a recommendation for optimizing the document format to the user.

9. The computer program product of claim 8, the stored program instructions further comprising:

program instructions to determine a review of the recommendation by the user is required;

program instructions to receive a response to the recommendation from the user; and program instructions to send the document to a printer.

10. The computer program product of claim 8, the stored program instructions further comprising:

program instructions to determine the document was printed previously by a third user;

program instructions to determine that the third user is within a threshold distance of the first user;

program instructions to alert the user the document was printed previously; and program instructions to cancel the request.

11. The computer program product of claim 8, the stored program instructions further comprising:

program instructions to log the request; and program instructions to log an outcome of the request.

12. The computer program product of claim 8, the stored program instructions further comprising:

responsive to determining the request does not comply with the one or more printing policies, program instructions to alert the user that the request does not comply with the one or more printing policies; and program instructions to cancel the request.

13. The computer program product of claim 8, wherein the one or more format attributes of the document include at least one of: a font type, a font size, a line spacing, a number of pages, a page margin size, whether the document is set up for double-sided printing, whether an ink is color or black and white, whether images are present, a size of an image, a color of an image, and a resolution of an image.

14. The computer program product of claim 8, the stored program instructions further comprising:
responsive to determining the document format is not optimized, program instructions to change automatically one or more of the one or more format attributes of the document to optimize the format.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive a request from a user to print a document;
program instructions to determine the document was printed previously by a second user;
program instructions to determine that the second user is not within a threshold distance of the first user;
program instructions to identify a content and a context of the document;
based on the content and the context of the document, program instructions to determine whether the request complies with one or more printing policies, wherein at least one of the one or more printing policies pertains to a job role of the user;
responsive to determining that the second user is not within a threshold distance of the first user and that the request complies with the one or more printing policies, program instructions to determine one or more format attributes of the document;
based on the one or more format attributes, program instructions to determine whether a document format is optimized, wherein optimization minimizes use of one or more printing supplies; and
responsive to determining the document format is not optimized, program instructions to provide a recommendation for optimizing the document format to the user.

16. The computer system of claim 15, the stored program instructions further comprising:
program instructions to determine a review of the recommendation by the user is required;
program instructions to receive a response to the recommendation from the user; and
program instructions to send the document to a printer.

17. The computer system of claim 15, the stored program instructions further comprising:
program instructions to determine the document was printed previously by a third user;
program instructions to determine that the third user is within a threshold distance of the first user;
program instructions to alert the user the document was printed previously; and
program instructions to cancel the request.

18. The computer system of claim 15, the stored program instructions further comprising:
program instructions to log the request; and
program instructions to log an outcome of the request.

19. The computer system of claim 15, the stored program instructions further comprising:
responsive to determining the request does not comply with the one or more printing policies, program instructions to alert the user that the request does not comply with the one or more printing policies; and
program instructions to cancel the request.

20. The computer system of claim 15, the stored program instructions further comprising:
responsive to determining the document format is not optimized, program instructions to change automatically one or more of the one or more format attributes of the document to optimize the format.

* * * * *